(12) United States Patent
Meyer

(10) Patent No.: US 10,495,237 B1
(45) Date of Patent: Dec. 3, 2019

(54) PIPING AND CONDUIT SUPPORT RACK

(71) Applicant: Robroy Industries—Texas, LLC, Gilmer, TX (US)

(72) Inventor: Ronald Meyer, Labadie, MO (US)

(73) Assignee: Robroy Industries—Texas, LLC, Gilmer, TX (US)

( * ) Notice: Subject to any disclaimer, the term of this patent is extended or adjusted under 35 U.S.C. 154(b) by 0 days.

(21) Appl. No.: 15/939,246

(22) Filed: Mar. 28, 2018

Related U.S. Application Data

(60) Provisional application No. 62/478,464, filed on Mar. 29, 2017.

(51) Int. Cl.
*F16L 3/00* (2006.01)
*F16L 3/22* (2006.01)
*F16L 3/10* (2006.01)

(52) U.S. Cl.
CPC ............ *F16L 3/221* (2013.01); *F16L 3/1075* (2013.01)

(58) Field of Classification Search
CPC ............ H02G 3/32; B60R 2011/0071; B60R 16/0207; F16L 3/12
USPC ...... 248/49, 62, 65, 70, 73, 74.1, 74.2, 74.4, 248/80, 83, 85, 89
See application file for complete search history.

(56) References Cited

U.S. PATENT DOCUMENTS

| | | |
|---|---|---|
| 3,948,473 A | 4/1976 | Mason |
| 4,029,301 A | 6/1977 | Mighton |
| 4,241,117 A | 12/1980 | Figge |
| 4,690,359 A | 9/1987 | Phillips |
| 4,901,958 A | 2/1990 | Kelso |
| 5,049,700 A | 9/1991 | Kobayashi et al. |
| 5,050,824 A * | 9/1991 | Hubbard ............... F16L 3/24 248/57 |
| 5,354,952 A | 10/1994 | Hickey |
| 5,593,115 A * | 1/1997 | Lewis ............... F16L 3/227 248/200.1 |
| 5,782,441 A | 7/1998 | Shimizu |
| 5,785,457 A | 7/1998 | Thompson |
| 5,931,423 A | 8/1999 | Heideloff |
| 6,044,194 A | 3/2000 | Meyerhoefer |
| 6,065,614 A * | 5/2000 | Gunther ............... H05K 7/1425 211/41.17 |
| 6,422,253 B1 | 7/2002 | Glynn et al. |
| 6,491,475 B1 | 12/2002 | Shimizu |
| 6,561,473 B1 | 5/2003 | Ianello |
| 6,729,588 B2 | 5/2004 | Wilkinson |
| 6,908,116 B2 | 6/2005 | Chu |
| 6,945,735 B1 * | 9/2005 | Doverspike ............... F16L 1/09 248/207 |
| 7,121,041 B2 | 10/2006 | Anderson et al. |
| 7,165,704 B2 | 1/2007 | Lo |
| 7,322,614 B2 * | 1/2008 | Reeves ............... F16L 55/1725 138/97 |
| 7,352,947 B2 | 4/2008 | Phung |
| 7,367,363 B2 | 5/2008 | Friedline et al. |
| 7,425,682 B2 | 9/2008 | Rasmussen |
| 7,543,606 B2 | 6/2009 | Friedline et al. |

(Continued)

*Primary Examiner* — Steven M Marsh
(74) *Attorney, Agent, or Firm* — The Webb Law Firm

(57) ABSTRACT

A rack system for supporting conduits, piping, wiring, etc, are provided. The rack has an inverted V shape, and a level top ridge for supporting the conduits, etc. The rack has an opening in the ridge through which a bolt extends and continues through a standoff adapted to securely fit down both sides of the inverted V.

9 Claims, 6 Drawing Sheets

(56) References Cited

U.S. PATENT DOCUMENTS

| | | | |
|---|---|---|---|
| 7,614,602 B2 | 11/2009 | Hutter | |
| 7,845,597 B2 | 12/2010 | Gatta | |
| 7,938,380 B2 | 5/2011 | Becker | |
| D653,524 S | 2/2012 | Meyer | |
| 8,348,215 B1 | 1/2013 | Smith | |
| 8,994,935 B2 * | 3/2015 | Kinney | G01B 11/27 356/138 |
| 9,556,927 B2 * | 1/2017 | Smith | F16F 15/03 |
| 2015/0159781 A1 * | 6/2015 | Wilson | F16L 3/227 248/67.5 |
| 2016/0327187 A1 * | 11/2016 | Brown | F16L 3/221 |

* cited by examiner

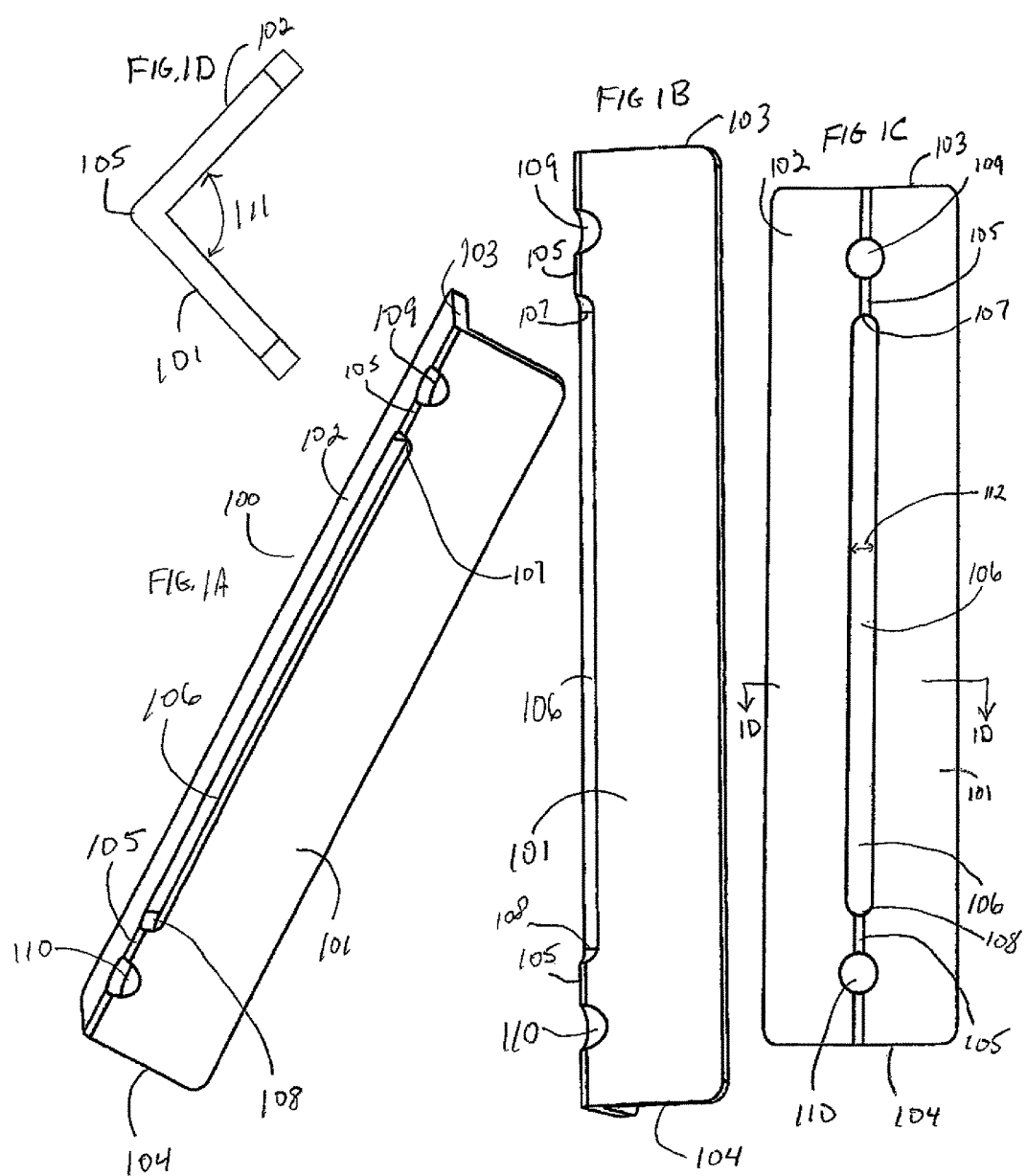

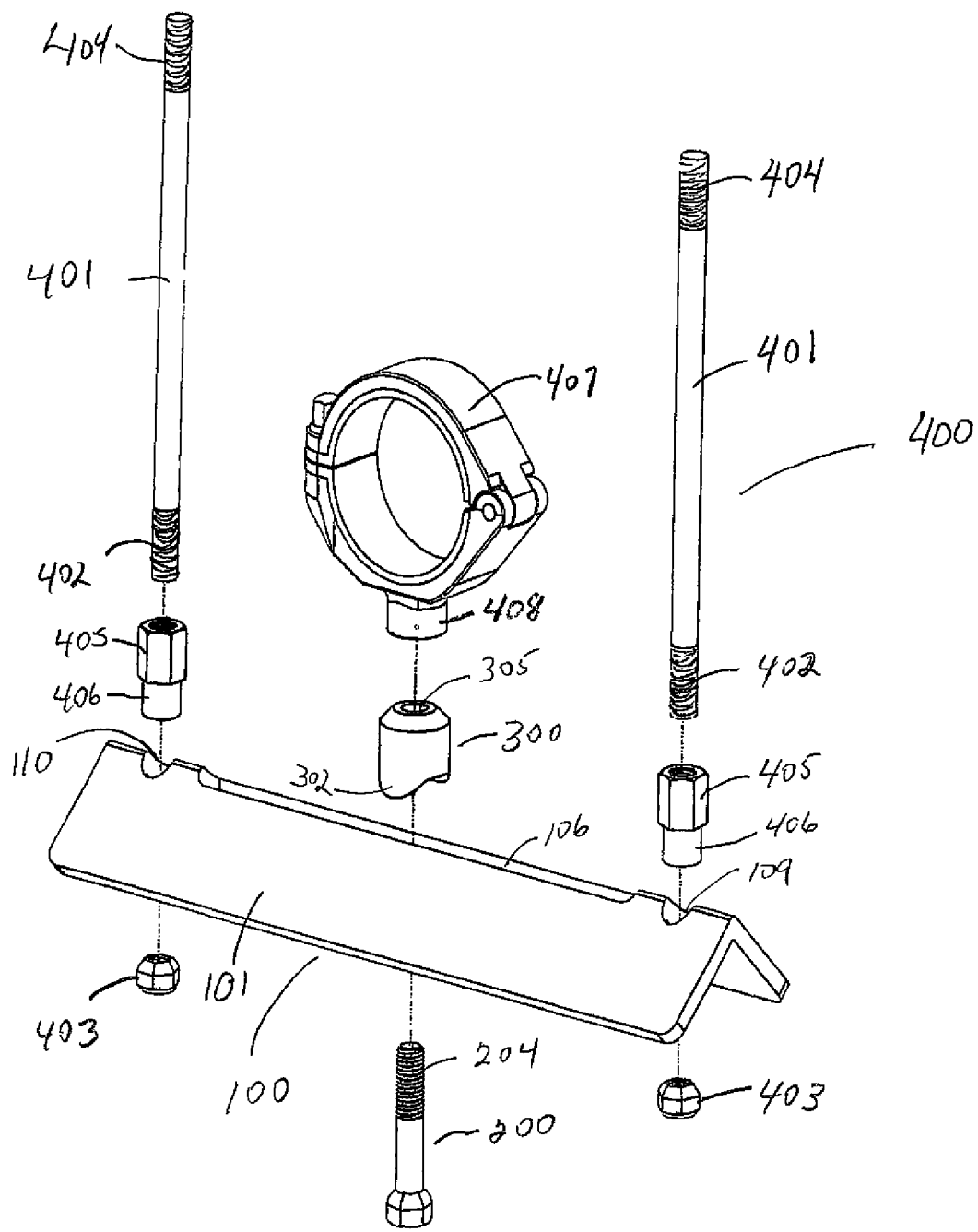

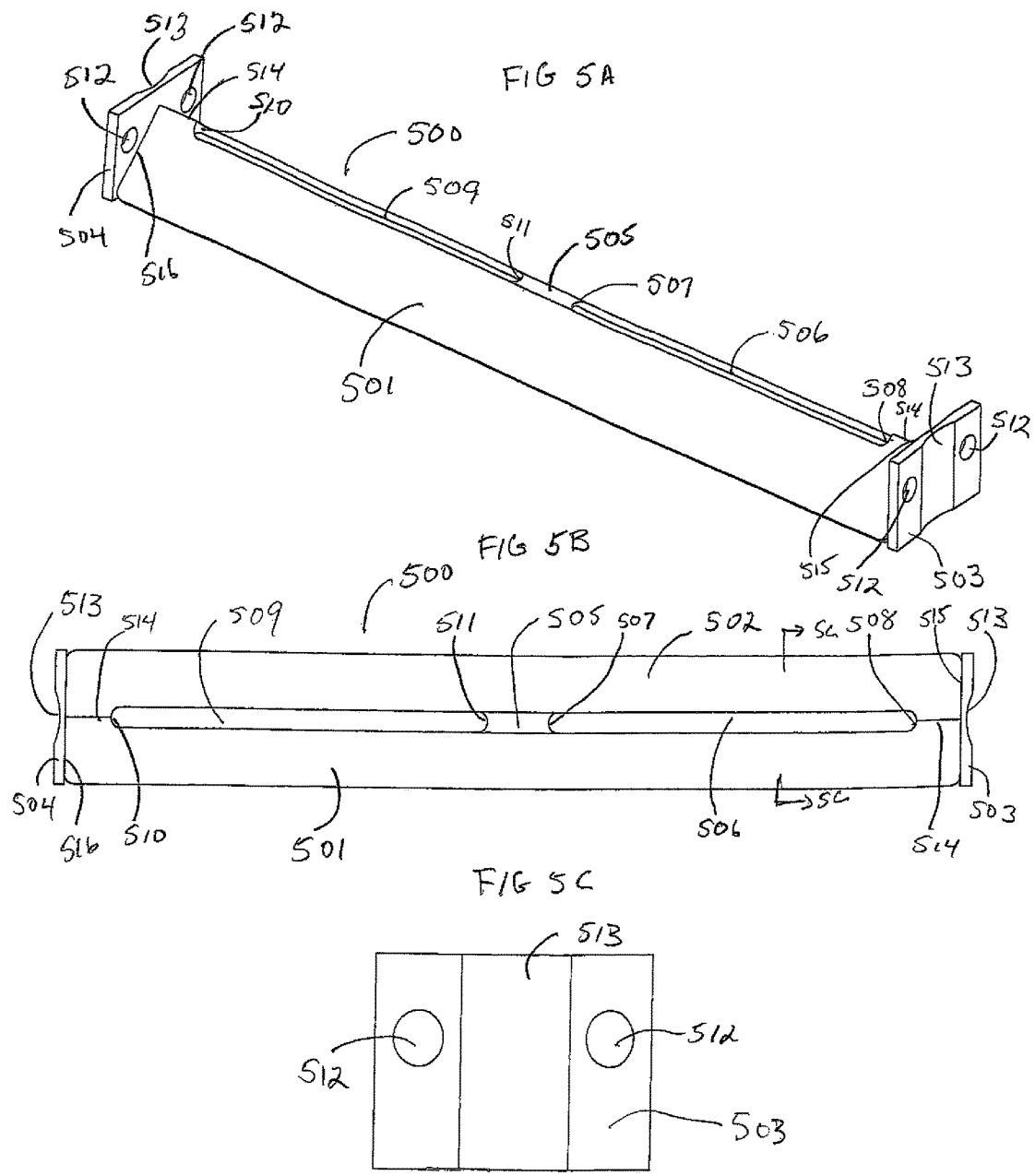

United States Patent

PIPING AND CONDUIT SUPPORT RACK

CROSS REFERENCE TO RELATED APPLICATION

This application claims the benefit of U.S. Provisional Application No. 62/478,464, filed Mar. 29, 2017.

FIELD OF THE INVENTION

This invention relates to racks used to support electrical conduits, cable tray, plumbing pipes and process piping in a sanitary manner.

BACKGROUND OF THE INVENTION

In typical construction projects in the food processing, health, consumer goods, electronics and medical industries, the electrical and plumbing contractors are responsible for creating support racks for the plumbing, conduits, cable trays and wiring that will be installed. The process involved in creating and building these racks is one that involved manpower and time. Each construction project is different, and requires the contractors to custom build each rack system to fit the project. The time is spent measuring the length of the racks, measuring where the support posts or rod hangers will be installed, drilling holes for the support posts or rod hangers, welding the different pieces together, and other time consuming actions.

Additionally, in these types of projects the support racks need to be made so they can be cleaned frequently to remove dirt and moisture, and to avoid the growth of bacteria, mold and other hazards. In traditional and typical projects, the rack systems were not designed with those criteria in mind. Due to the need for on-site customization, the typical methods even increased the risk that contaminants could be introduced into the manufacturing processes.

Recently, new rack systems and structures have been introduced that are directed to address the problem of timely custom construction, and also the special needs of the food and health industries. These rack systems have pre-made openings allowing flexibility in installation. The racks are typically suspended from the ceilings by way of hanger rods, and the conduits and piping can be installed where it is most convenient for the job. Also, racks have been designed with angled side walls that make it more difficult for dirt and moisture to build, and are easier to clean. However, using conventional hardware can also present the risk of contamination. For example, in U.S. Pat. No. 7,543,606, (the '606 Patent) structures for supporting conduits in a sanitary manner are disclosed. The patent discloses a conduit support and a conduit receiving area in the support. The support is attached to conduits that can be square, round, hollow or solid, via bolts, welding, snap locks. The conventional hardware for securing the supports, as shown in the figures of the '606 Patent all have edges and surfaces on which contaminants can collect.

In view of these disadvantages, there remains a need for a rack system that employs integrated hardware for reducing the risk of contaminant collection. Also, there remains a need to use these support racks from structures, such as pipes or poles or posts, that are installed from the floor up.

SUMMARY OF THE INVENTION

In one aspect, this invention is a rack support system comprising a rack with a first side wall and a second side wall connected to form an inverted v shape with a top ridge. The rack further has a first opening in the ridge, defined between a first edge and second edge to provide a level surface between the first and second edge. The system further comprises a bolt with a head that has a beveled profile to match the angle formed by the v shape on an underside of the rack. The bolt further comprises a shank, and a threaded portion which extend through the opening in the rack and are exposed on the top side of the level surface of the rack ridge. The shank and threaded portion further extend through an opening in a standoff that allows the threaded portion to partially extend above the top surface of the standoff. The standoff further comprises leg portions extending over the first and second side walls, and at angles that match the angle formed by the two side walls.

In another aspect, this invention is a rack having a first side wall and second side wall connected to form an inverted v shape with a top ridge. The rack further has a first opening in the ridge, defined between a first edge and second edge to provide a level surface between the first and second edge. The side walls terminate at a first end and a second end. At these ends are attached a first plate and a second plate. The outer surfaces of the first plate and second plates have concave indentations.

In another aspect, this invention is a rack or support system comprising the rack described above secured to a first post at the first end, and a second post at the second end by fastening means.

DESCRIPTION OF THE DRAWINGS

FIG. 1A is a perspective view of a rack embodiment of this invention showing the inverted v shape.

FIG. 1B is a view from one side of a rack embodiment of this invention.

FIG. 1C is a top view of a rack embodiment of this invention showing the opening in the ridge on the top of the rack.

FIG. 1D is an end view of a rack embodiment of this invention showing the inverted v shape, and the angle formed on the underside of the rack taken along line 1D-1D of FIG. 1C.

FIG. 4 is an exploded view of an embodiment of the rack system of this invention showing how the rack, bolt, standoff, and conduit support member are cooperatively constructed.

FIG. 5A shows a perspective view of one embodiment of the rack showing the inverted v shape and with attached end plates.

FIG. 5B shows a top view of the embodiment showing the opening in the ridge on the top of the rack.

FIG. 5C shows an end view of the embodiment of the rack showing two openings viewed along line 5C-5C of FIG. 5B.

DETAILED DESCRIPTION OF THIS INVENTION

Figure 2B:
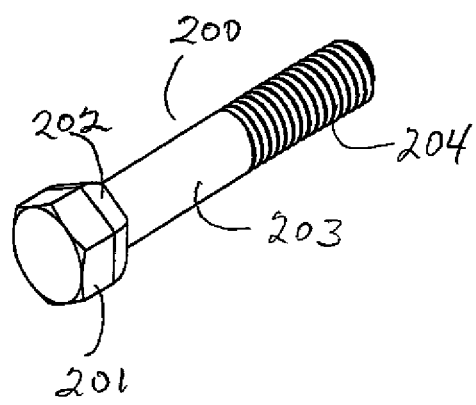
FIG. 2B is a perspective view of a bolt embodiment of this invention.

Referring now to the drawings for the purposes of illustrating embodiments of the invention only, and not for the purposes of limiting the same. FIGS. 1A-D show an embodiment of a rack of this invention with an inverted V shape. Rack 100, has first side wall 101, and second side wall 102 terminating in end 103 and end 104. Ridge 105 is formed at the juncture of side wall 101 and side wall 102, and has elongated opening 106 formed between edge 107 and edge 108. Rack 100 is shown with a single opening, but other embodiments can have 2 or more openings depending on the length of the rack, and its purpose. Opening 106 has width 112 as shown in FIG. 1C. The surface is flat between edge 107 and edge 108. The rack further comprises first circular opening 109 toward end 103, and second circular opening 110 toward end 104 which provide means for attaching rack 100 to hanger rods (not shown) extending down from an upper stationary structure such as a ceiling or beam, which will be shown and discussed further in FIG. 4.

FIG. 1D shows rack 100 with side wall 101 and side wall 102 forming an inverted V with top ridge 105. On the inner surface of rack 100, angle 111 is formed by the juncture of side wall 101 and side wall 102. In a preferred embodiment, ridge 105 can be milled down to provide a flat surface along the entire ridge of the rack.

Figure 2A:
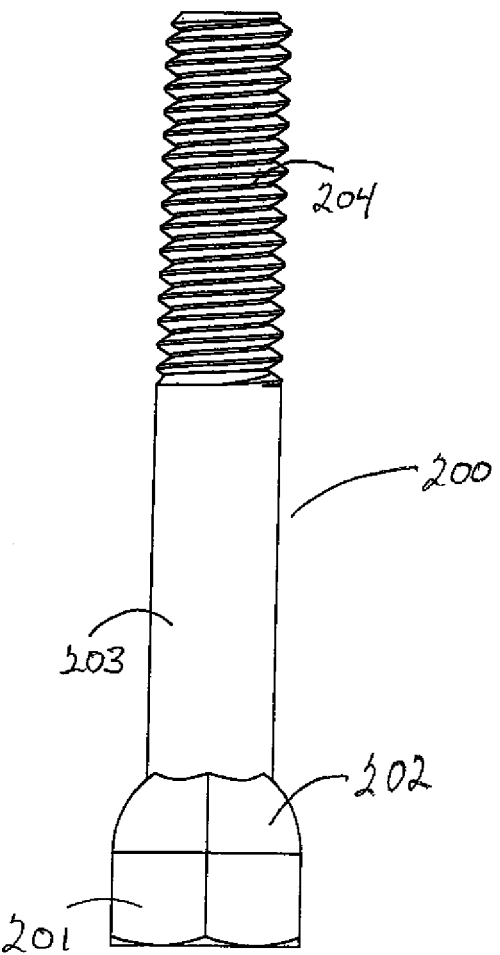
FIG. 2A is a side view of a bolt embodiment of this invention showing the beveled head.

FIGS. 2A-B show a beveled bolt 200 embodiment of this invention. Bolt 200 comprises head 201 with beveled shoulder 202. Bolt 200 also comprises shank 203 and threaded end portion 204. The bevel in shoulder 202 is designed to match, and preferably fit flush with angle 111 formed on the inner surface of rack 100.

Figure 3A:
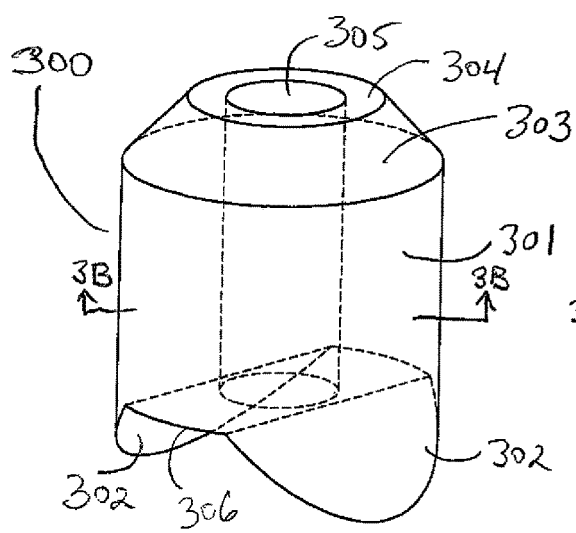
FIG. 3A is a perspective view of a standoff embodiment of this invention.
Figure 3B:
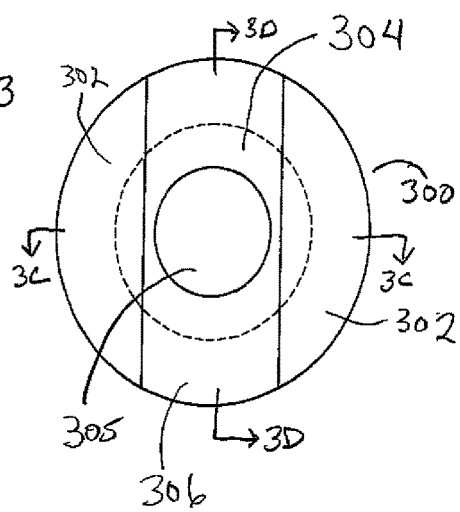
FIG. 3B is a bottom view of a standoff embodiment of this invention viewed along line 3B-3B of FIG. 3A.
Figure 3C:
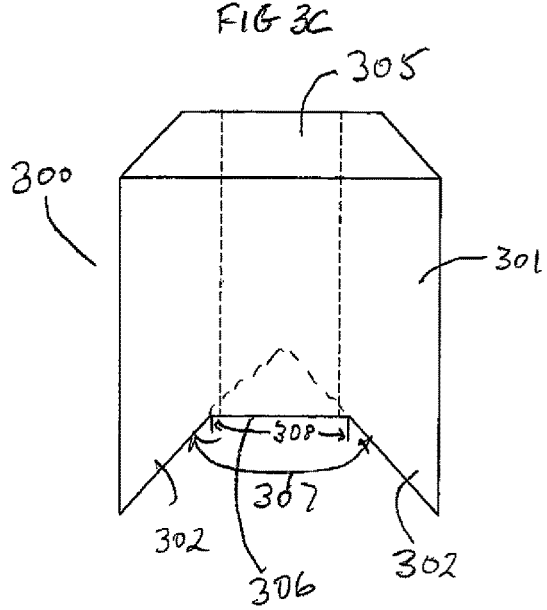
FIG. 3C is a side view of a standoff embodiment of this invention viewed along line 3C-3C of FIG. 3B.
Figure 3D:
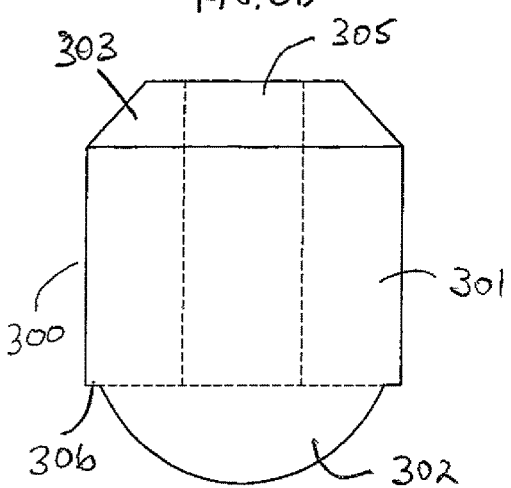
FIG. 3D is a second side view of a standoff embodiment of this invention viewed along line 3D-3D in FIG. 3B.

FIGS. 3A-C show a standoff 300 embodiment of this invention. Standoff 300 comprises body 301 with legs 302 extending from the bottom portion 305 of body 301. Preferably, bottom portion 106 has a width 308 (shown in FIG. 3C) that is substantially equal to the width 112 of the outer edges of opening 106 in rack 100. Legs 302 have a slope that substantially matches the slope and angle formed by the inverted V of rack 100. The angle 307 that would be formed if legs 302 met is substantially matches angle 111. The top of body 301 comprises tapered shoulder 303, and top surface 304. Throughout body 301 of standoff 300 extends an opening 305.

FIG. 4 shows a rack system 400 embodiment of this invention combining elements rack 100, bolt 200, and standoff 300. System 400 also comprises hanger rods 401 for securing rack 100 to a support, such as a ceiling (not shown) through threaded ends 404. Hanger rod 401 has threaded end 402 for extending through openings 109 and 110 in rack 100. Hanger rod 401 is secured to rack 100 with nut 403 covering threaded end 402, which nut 403 preferably has a beveled shoulder matching angle 111 on the inner surface of rack 100. It is preferred, that nut 403 has the same beveling as the shoulder of bolt 200. By beveling to fit angle 111, contaminants are prevented from collecting on the surface of head 201. It is also preferred that nut 403 completely covers threaded ends 402 to avoid contaminants from collecting on the threaded ends 402. Hanger rod 401 can be any form for supporting the rack, such as a rod of steel with threaded ends. Preferably, the hanger rod is threaded on its entire length and covered with a plastic sheath. The sheath is readily removed by cutting to expose the length of thread need for the particular application. By sheathing the threaded rod in plastic, contaminants are prevented from forming on the threads. The rack system 400 can further comprise spacer 405 that has end 406 designed to fit in openings 109 and 110. This prevents contaminants from collecting in openings 109 and 110. Preferably, spacer 405 has smooth sloped edges to reduce the surface on which dirt, debris, and contaminants can collect.

Rack system 400 shows bolt 200 on the underside of rack 100 with end 204 extending through opening 106 in rack 100 and opening 306 in standoff 300. Threaded end 204 secures conduit support member 407 through end 408. Once assembled, standoff 300 fits with legs 301 and 302 (not shown) fully integrated with side walls 101 and 102 (not shown) of rack 100. Because of the smooth sloped or slanted surfaces of standoff 300, and because legs 301 and 302 fit flush on surfaces 101 and 102, there are few flat surfaces or edges for contaminants to collect.

FIGS. 5A-C, show an embodiment of rack 500 of this invention with an inverted V shape formed by sides 501 and 502, and with attached end plates 503 and 504. As this embodiment is suitable for installation on floor posts, it does not have openings in the ridge to allow hanging via hanging rods. Rack 500 has opening 505 formed between edges 507 and 508, and opening 509 formed between edges 510 and 511. Openings 506 and 509 are separated by surface 505, which is milled down to be level with openings 506 and 509. Ridge 514 extends above openings 506 and 509. Plate 503 is attached to end 515, and plate 504 is attached to end 516. Openings 512 are in plates 503 and 504 for receiving fastening means or securing members. On the outer surface of plates 503 and 504 are concave indentations 513.

In FIG. 5B, side wall 502 can be seen along with side wall 501. Concave indentations 513 are shown, as are openings 506 and 509 formed between edges 507 and 508, and 510 and 511, respectively. FIG. 5C is an end view showing plate 503 with openings 512 and indentations 513.

Figure 6:
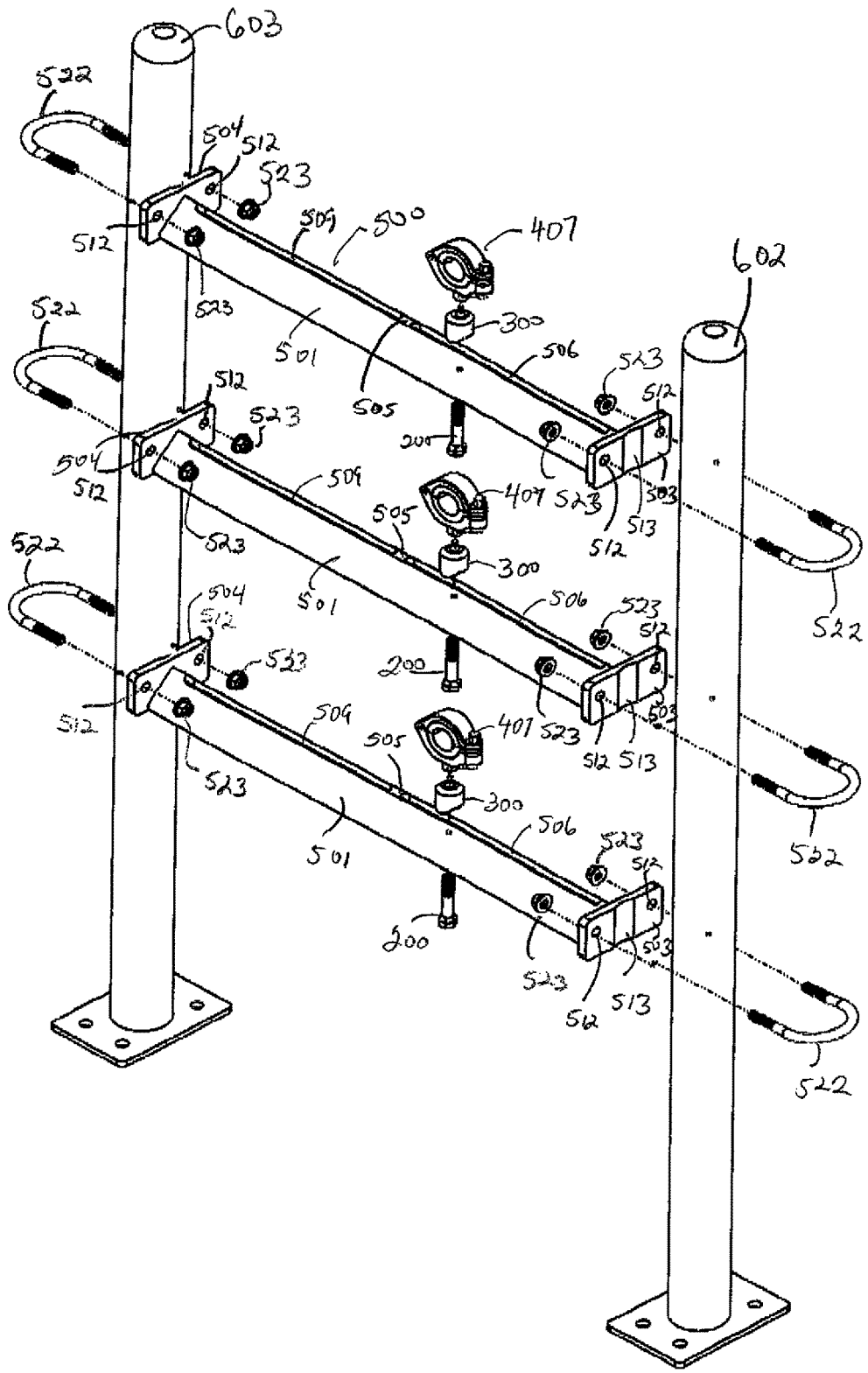
FIG. 6 is an exploded viewing showing the rack embodiment of this invention with end plates attached to posts.

The rack system embodiment of this invention attached to support posts 520 is shown in FIG. 6. Rack 500 is secured to posts 602 and 603 via fasteners in the form of U-bolts 522 and securing members 523. Other fastening means are suitable based on the installation, and examples are welding and adhesives. The ends of U-bolt 522 are threaded and pass through holes 512 and 513. They are secured with securing members in the form of nuts 523. Once secured, the posts 602 and 603 are seated in indentations 513 of ends 503 and 504. Conduit support member 407 is spaced above rack 500 by standoff 300, and secured by bolt 200 which extends up from the underside of rack 500 through opening 506, then through standoff 300. Support member 407 is threaded onto threaded portion 204 of bolt 200.

Once assembled, the rack system can accommodate a variety of conduits, pipes, wiring, cable trays, and other items (not shown). Because the top surface of the ridge is level, and because the openings extend substantially the entire length of the ridge, the conduits, pipes etc. can be efficiently placed anywhere along the surface of the ridge. This results in quicker installation of the conduits, etc. as the need to drill precisely located openings is avoided. The inverted V is desirable in installations with sanitation concerns, such as food, health, consumer goods, electronics, and drug manufacturing, as the slope surfaces do not collect dust, dirt, and debris as readily as flat surfaces, and are easier to clean.

The racks of this invention can be made from materials typically used in the construction industry for electrical and plumbing conduit support systems. These materials include stainless steel, aluminum, hot-dipped galvanized or mild steel angle, channel or flat bar. Preferred materials include 304 and 316 Stainless Steel, 6061 T6 Extruded Aluminum angle, channel or flat bar.

The racks can be formed into the inverted V shape by conventional means. For stainless steel, the angle is rolled out of a steel mill. For aluminum, the angle is extruded. The constructed rack can have any desired angle, with 90° being preferred. Once the material is mill-rolled or extruded to the desired shape, it is cut to various lengths. It is desirable to cut openings into the top ridge by waterjet, CNC Milling machine, plasma or laser cutter. There are two types of openings made in the ridge. One type is formed by cutting a channel or slot in the ridge. This channel/slot gives a user the flexibility to install piping, conduits, cable trays, and wiring readily along any part of the rack. The other type of opening is a support opening. This opening is used to attach the rack to a ceiling or other support structure. It is through this opening that the hanger rod of this invention will be passed through. In FIG. 1, the edges of the opening are shown extending above the flat areas formed from the openings. Optionally, the edges could be machined down to provide a level surface all along the top ridge of the rack.

The underside head of the bolts used in this invention have a beveled surface to match the angle formed on the inner surface of the rack. The bolts can be made from 304 or 316 Stainless Hex Stock machined into the shape of a bolt. The hex stock is cut to any length suitable for the project, and threads cut into a portion of the shank leaving the shoulder (unthreaded portion) and then beveling the underside of the bolt head to match the angle of the underside of the rack. In the preferred embodiment, the angle of the inner surface is 90°, and the angle of the beveled shoulder is substantially 45°. This process is completed on a threading machine, CNC milling machine & lathe.

Because the bevel has the same angle as the inner surface of the walls of the rack, when fully assembled the beveled head of the bolt will preferably lie flush with the inner surfaces of the rack walls. The flush connection significantly reduces the space dirt, moisture, and other contaminants can cling, thus reducing the potential for mold and bacterial growth on the surface of the bolt. Hanging the support rack from the ceiling is done by securing hanger rods from above and passing them through mounting hardware such as spacer #405 through the hole in the rack, and secured with a nut, which is preferably beveled to match the angle of the inner surface of the rack.

The standoff used in this invention is shown in FIG. 3, and is designed to straddle the top of the inverted V rack. The legs have inner angled surfaces that match the angle formed on the upper surface of the walls of the rack. Thus, the legs preferably lie flush on the upper surface of the rack. This flush connection significantly reduces the sites where contaminants, dirt and moisture can collect, and thereby, reduce the potential for mold and bacterial growth on the surface of the rack. The standoff with beveled bolt of this invention can be used with various sanitary pipe clamps installed over the opening slot to support the conduit, such as shown in FIG. 4. When used with such clamps, the need for an installer to weld a separate steel spacer to rack is eliminated. The standoff and beveled bolt allow for adjustability to help ensure that the clamp is perfectly level as opposed to the more permanent/stationary weld in traditional rack systems. The standoff is a piece of 304S (or 316S) round stock that is cut to length, machined to conform seamlessly to the shape of the inverted V rack. An opening is bored through the length of the standoff and then the top is machined preferably with sloping shoulders, again to limit the space for dirt, etc. to collect. The beveled bolt (FIG. 2) is a 304S (or 316S) bolt whose head has been machined in a bevel so as to preferably perfectly fit into the web of the angle of the inverted V rack.

Machined mounting hardware, for example, spacer #405, is preferably used in this invention to space the support rod from the rack. The mounting hardware can be made from 304 or 316 hex stock. The mounting hardware is tapered as shown in #406 to fit into the hole in the rack. The spacer also has an opening through which the threaded portion of the hanger rod extends. The purpose of the mounting hardware is designed to cover any exposed thread portion of the installation support hanger rods. The hanger rod is secured from underneath by means of a nut, which is preferably beveled, to fit into the web of the angle of the inverted V rack. By covering the exposed threaded portion, the areas on which mold and bacteria can grow are reduced.

The end plates are made of the same materials as used for the racks of this invention. The outside surface of the end plates are machined out to form an indentation to sit flush to circular support poles or posts. This machining can be done by milling (CNC milling machine) the precise radius groove to match the radius of the support poles. The flat side (non-indented side) of the end plates are attached to the inverted V racks of this invention by a Tungsten Inert Gas Weld or TIG weld. Once the end plates are attached, the racks can be installed to support poles using suitable U-bolts, as is shown in FIG. 6.

The end supports 520 and 521 can be made of any material capable of supporting the racks, and the conduits, piping, or other materials supported on the racks. Preferably, they are circular to fit snugly with indentations 514, and are made of steel, although any material of suitable strength are suitable. The fasteners can be of any form suitable for enclosing the end supports, and can be in the form of U-bolts, or similar shapes. The ends of the fasteners can be threaded so they can be secured with nuts, or they can be secured by snap fasteners as well. These can be made of any material typically used for making fasteners and nuts. The plates can also be fastened or secured to the posts using other fastening means, such as welding, adhesives, or other means known to those skilled in the art.

What is claimed is:

1. A rack system comprising:
   a. a rack with a first side wall and a second side wall connected to form an inverted v shape with a top ridge, said inverted v shape forming an angle on an inner surface of the first and second side walls;
   b. an opening in the ridge, defined between a first edge and second edge to provide a level surface between the first and second edge;
   c. a bolt with a head that has a beveled shoulder to match the angle formed on the inner surface of the rack; said bolt further comprising a shank, and a threaded portion which extends through said opening in the rack and is exposed on a top side of the level surface of the top ridge; and
   d. a standoff sitting over the opening in the top ridge, said standoff comprising leg portions extending over the first and second side walls, and said standoff having an opening through which the threaded portion of said bolt partially extends above a top surface of the standoff.

2. The rack system of claim 1, wherein a bevel on the beveled shoulder of the bolt fits flush with the inner surface of the rack.

3. The rack system of claim 1, wherein the leg portions of the standoff sit flush along the first and second side walls.

4. The rack system of claim 2, wherein the leg portions of the standoff sit flush along the first and second side walls.

5. A rack comprising:
   a. a first side wall and second side wall connected to form an inverted v shape with a top ridge, said inverted v shape forming an angle on an inner surface of the first and second side walls;
   b. an opening between a first edge and a second edge in said top ridge to provide a level surface between the first and second edge;
   c. said first and second side walls terminating in a first end and a second end;
   d. a first plate comprising openings attached at said first end, and a second plate comprising openings attached at said second end; wherein said first plate and second plate each have an outer surface comprising a concave indentation;
   e. a first support to which the first plate is secured by a fastening means; and
   f. a second support to which the second plate is secured by a fastening means,
   wherein the first support and second support are circular posts, and the fastening means is a U-bolt around each of the posts with ends extending through the openings in the first and second plates, and the indentation on the first and second plates sit flush with the circular posts.

6. The rack system of claim 1, further comprising:
   e. said first and second side walls terminating in a first end and a second end;
   f. a first plate attached at said first end, and a second plate attached at said second end; wherein said first plate and second plate each have an outer surface comprising a concave indentation.

7. The rack system of claim 6, further comprising:
   g. a first support to which the first plate is secured by a fastening means; and
   h. a second support to which the second plate is secured by a fastening means.

8. The rack system of claim 7, wherein the first support and second support are circular posts, and the fastening means is a U-bolt around each of the posts with ends extending through openings in the first and second plates, and the indentation on the first and second plates sit flush with the circular posts.

9. The rack system of claim 7, wherein the fastening means is welding.

\* \* \* \* \*